(12) United States Patent
Ohta

(10) Patent No.: US 6,342,795 B1
(45) Date of Patent: Jan. 29, 2002

(54) CONTROL CIRCUIT HAVING CLOCK CONTROL UNIT

(75) Inventor: Yoshikatsu Ohta, Iwate-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/587,550

(22) Filed: Jun. 1, 2000

(30) Foreign Application Priority Data

Jun. 2, 1999 (JP) .......................................... 11-154681

(51) Int. Cl.[7] .......................... H03K 19/096; G05F 1/10
(52) U.S. Cl. ............................. 327/99; 327/544; 326/93
(58) Field of Search .................................. 327/544, 387, 327/398, 99; 326/93, 101; 365/233

(56) References Cited

U.S. PATENT DOCUMENTS 5,585,745 A * 12/1996 Simmons et al. ........... 327/544
5,675,282 A * 10/1997 Saito .......................... 327/544
5,768,213 A * 6/1998 Jung et al. ................... 365/233
6,100,732 A * 8/2000 Penry et al. .................. 327/99

FOREIGN PATENT DOCUMENTS

JP          6-83756          6/1994

* cited by examiner

Primary Examiner—Dinh T. Le
(74) Attorney, Agent, or Firm—Brinks Hofer Gilson & Lione

(57) ABSTRACT

Disclosed is a control circuit of a simplified circuit configuration and control while power consumed by the continuous supply of a clock signal to a functional block which is in an inoperative status is reduced. A functional block supplies a status detection signal indicative of an operative status or an inoperative status to a clock control unit. When the status detection signal indicates the operative status, the clock control unit supplies a clock signal to thereby operate the functional block. When the status detection signal indicates the inoperative status, the clock control unit stops the supply of the clock signal to thereby stop the functional block.

14 Claims, 8 Drawing Sheets

CONTROL CIRCUIT HAVING CLOCK CONTROL UNIT

BACKGROUND OF THE INVENTION

1. Field of the Invention

The present invention relates to a control circuit having a functional block which is formed on a semiconductor substrate, performs a predetermined operation in response to an input signal instructing an operative status under the control of a clock signal, stops the operation in response to an input signal instructing an inoperative status, and has therein a clock control unit for controlling the supply of the clock signal to the functional block or not.

2. Description of the Related Art

Hitherto, in a semiconductor integrated circuit obtained by integrating a plurality of functional blocks on a semiconductor substrate, a control circuit 1 shown in FIG. 16 is adopted for performing a control synchronously with a clock signal supplied from an external clock.

The control circuit 1 has a plurality of functional blocks 3 on a semiconductor substrate 2 in a manner similar to a conventionally used semiconductor integrated circuit. Each of the functional blocks 3 comprises a ROM, a RAM, an I/F circuit, and a random logic circuit having a predetermined function. Each of the functional blocks 3 is connected to a common data bus 4 and is accessed by an external CPU via the data bus 4. As shown in FIG. 17, the functional block 3 further comprises a combinatorial logic circuit 5, a flip flop 6 and a control register 7 as a clock control unit. An input signal is supplied to the combinatorial logic circuit 5 via a signal line of the common data bus 4.

Further, a clock signal is supplied through a signal line 4a included in the common data bus 4 to the control register 7. An instruction signal for instructing whether the clock signal is supplied or not is sent to the control register 7 via a signal line 4b included in the common data bus 4. When the instruction signal instructs the supply of a clock signal, the clock signal is supplied to a clock terminal of the flip flop 6 via a signal line in the functional block 3.

In an operative status in which an input signal is supplied to the functional block 3 and the functional block 3 performs a predetermined operation, "1" is latched in the control register 7. At this time, the control register 7 outputs a clock signal to a signal line 4c.

On the other hand, in an inoperative status in which no input signal is supplied to the functional block 3 and the functional block 3 does not perform a predetermined operation, a signal of "0" is latched in the control register 7. In this case, the control register 7 does not output a clock signal to the signal line 4c.

In the operative status, in response to the input signal supplied via the signal line 4c to the combinatorial logic circuit 5, a predetermined process is performed under the control of the clock signal. The result of the process is outputted as an output signal to the outside of the functional block 3.

Since the supply of the clock signal can be stopped in the inoperative status in which no input signal is supplied to the functional block 3 and the functional block 3 does not perform the predetermined operation, power consumed by the clock signal can be suppressed.

In the conventional control circuit, however, since the supply of the clock signal is controlled by the input signal supplied from the outside to the functional block 3, it is necessary to provide a function of determining the timing to stop the functional block 3 on the outside of the functional block 3 or design the circuit so that the control unit for generating the clock control signal operates synchronously with the input signal.

It therefore causes a problem such that the control is complicated and the size of the circuit is increased.

SUMMARY OF THE INVENTION

The present invention has been achieved in consideration of the above problems. It is an object of the invention to provide a control circuit of a simplified circuit construction and control while power consumed by the continuous supply of a clock signal to a functional block which is in an inoperative status is reduced.

It is another object of the invention to provide a control circuit comprising: a functional block which is provided on a semiconductor substrate, performs a predetermined operation in response to an input signal requesting an operative status under the control of a clock signal, and stops the predetermined operation in response to a signal requesting an inoperative status; and a clock control unit which is provided in the functional block and controls the supply of the clock signal to the functional block, wherein the functional block supplies a status detection signal indicative of the operative status or the inoperative status to the clock control unit, when the status detection signal supplied from the functional block indicates the operative status, the clock control unit supplies the clock signal to operate the functional block, and when the status detection signal supplied from the functional block indicates the inoperative status, the clock control unit stops the supply of the clock signal to stop the functional block. Consequently, the operation of the functional block which is not in use can be stopped and it is unnecessary to provide a particular control unit for supplying a control signal to control the clock signal on the outside of the functional block.

It is further another object of the invention to provide a control circuit, wherein a plurality of the functional blocks are connected to each other, some of the plurality of functional blocks have different operation timings, at least one functional block which operates first is set to be in the inoperative status when an output signal is outputted to at least one functional block which operates later, and a status detection signal indicative of the inoperative status is outputted to a clock control unit of the functional block which operates first. Consequently, even when the functional block which operates first and the functional block which operates later are not simultaneously in the operative status, data can be supplied to the functional block which operates later. The maximum power consumption of the clock signal by the simultaneous operation can be therefore reduced. Further, due to the supply of a new input signal to the functional block which operates first, an output signal outputted, before the supply, to the functional block which operates later does not change. Consequently, the functional block which operates later can be prevented from an erroneous operation and, further, the circuit designing can be facilitated.

Further another object of the invention is to provide a control circuit wherein the clock control unit further comprises a frequency dividing circuit. The occurrence of a hazard in the waveform of a clock signal and a fluctuation in the pulse width due to an error in time between a clock signal supplied from the outside to the clock control unit and a clock signal supplied from the clock control unit to a functional block can be prevented. Thus, the functional block can be prevented from an erroneous operation.

Further another object of the invention is to provide a control circuit wherein the functional block has a plurality of operative statuses, and the clock control unit supplies a clock signal of a dividing ratio which varies according to the operation status of the functional block. Also in the functional block having the plurality of operative statuses, the occurrence of a hazard in the waveform of a clock signal and a fluctuation in the pulse width due to an error in time between a clock signal supplied from the outside to the clock control unit and a clock signal supplied from the clock control unit to a functional block can be prevented. Thus, the functional block can be prevented from an erroneous operation.

DETAILED DESCRIPTION OF THE PREFERRED EMBODIMENTS

Embodiments of the invention will be described hereinbelow with reference to FIGS. 1 to 15.

Figure 1:
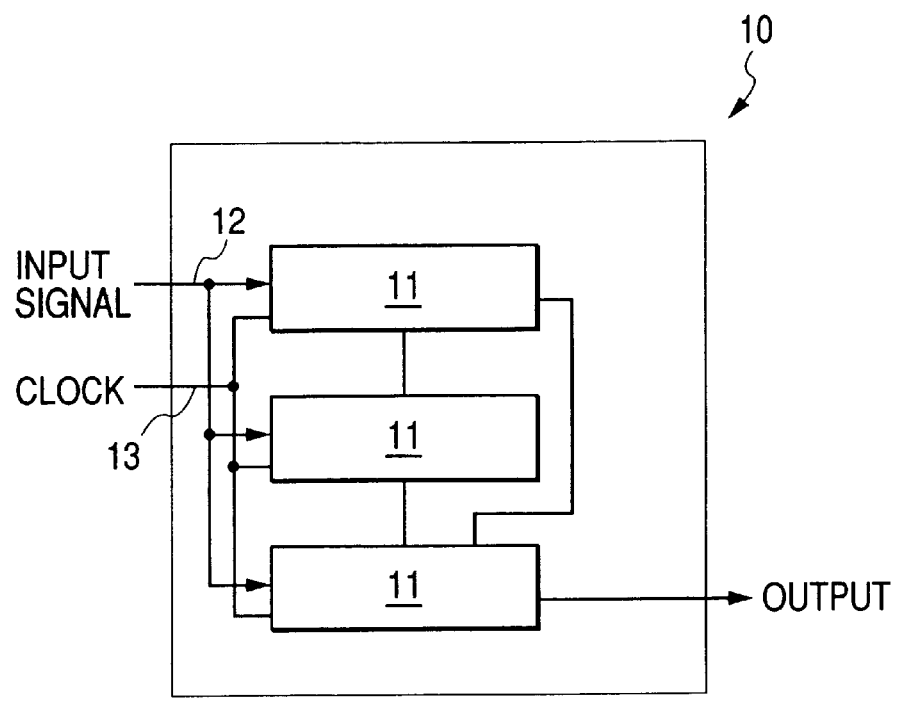
FIG. 1 is an explanatory diagram showing a first embodiment of a control circuit according to the invention.

FIG. 1 shows a first embodiment of a control circuit according to the invention. A control circuit 10 in the first embodiment has a plurality of functional blocks 11.

A data bus 12 is connected to each of the functional blocks 11 and an input signal is supplied from a CPU to each of the functional blocks 11 via the data bus 12. A clock bus 13 is connected to each of the functional blocks 11 and a clock signal is supplied to each of the functional blocks 11 via the clock bus 13.

Figure 2:
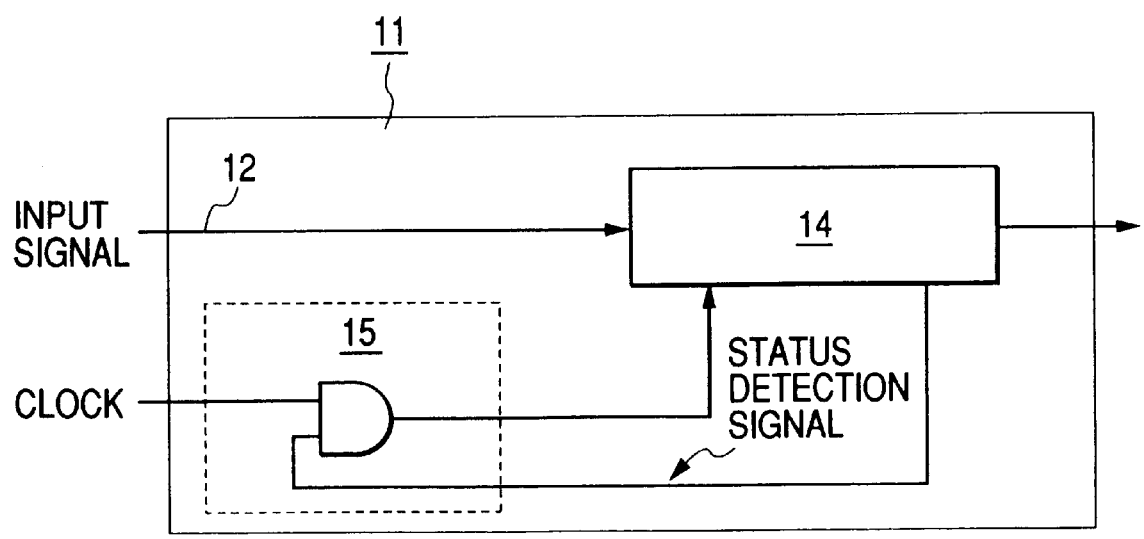
FIG. 2 shows a functional block in the first embodiment of the control circuit according to the invention.

As shown in FIG. 2, the functional block 11 has an operating unit 14 for performing a predetermined operation such as outputting of an output signal in accordance with an operative status requested by the input signal supplied via the data bus 12. The operating unit 14 is constructed by a combinatorial logic circuit, a flip flop, and the like (which are not shown).

Further, the functional block 11 has a clock control unit 15 comprising an AND gate for controlling the supply of the clock signal inputted from the outside to the operating unit 14.

The clock control unit 15 supplies the clock signal to the operating unit 14 and the operating unit 14 processes the input signal under the control of the supplied clock signal.

When the input signal requests an operative status, the operating unit 14 outputs a status detection signal indicative of the operative status to the clock control unit 15. On the other hand, when the input signal does not request the operative status, the operating unit 14 outputs a status detection signal indicative of an inoperative status to the clock control unit 15. Further, when the result of the process of the input signal is outputted as an output signal to the outside of the functional block 11, the operating unit 14 outputs the status detection signal indicative of the inoperative status to the clock control unit 15.

When the operative status is detected by the status detection signal, the clock control unit 15 supplies the clock signal to the operating unit 14. On the other hand, when the status detection signal indicates the inoperative status, the clock control unit 15 stops the supply of the clock signal to the operating unit 14.

The action of the control circuit 11 in the first embodiment will now be described.

In an initial status, the operating unit 14 in the functional block 11 is in the inoperative status. "0" indicative of the inoperative status is set in the status detection signal. The clock control unit 15 therefore stops the supply of the clock signal to the operating unit 14.

An input signal is supplied from the CPU (not shown) to the operating unit 14 in the functional block 11 via the data bus 12. Consequently, in response to the input signal, the operating unit 14 enters the operative status. The operating unit 14 outputs the status detection signal of "1" indicative of the operative status to the clock control unit 15.

When the status detection signal of "1" indicative of the operative status is received, the clock control unit 15 supplies a clock signal inputted from the outside to the operating unit 14.

Under the control of the clock signal, the operating unit 14 processes the input signal and outputs the result of the process as an output signal to the outside of the functional block 11.

According to the first embodiment, therefore, it is unnecessary to provide particular control means (signal source) for controlling the supply of the clock signal on the outside of the functional block 11. The supply of the clock signal can be controlled by detecting a change in the input signal, that is, the operation request to the functional block. Consequently, power consumed by the clock signal can be suppressed with the simple circuit configuration.

A second embodiment of the clock control signal according to the invention will now be described.

As a control circuit in the second embodiment, a control circuit for controlling recording of a printer will be used.

Figure 3:
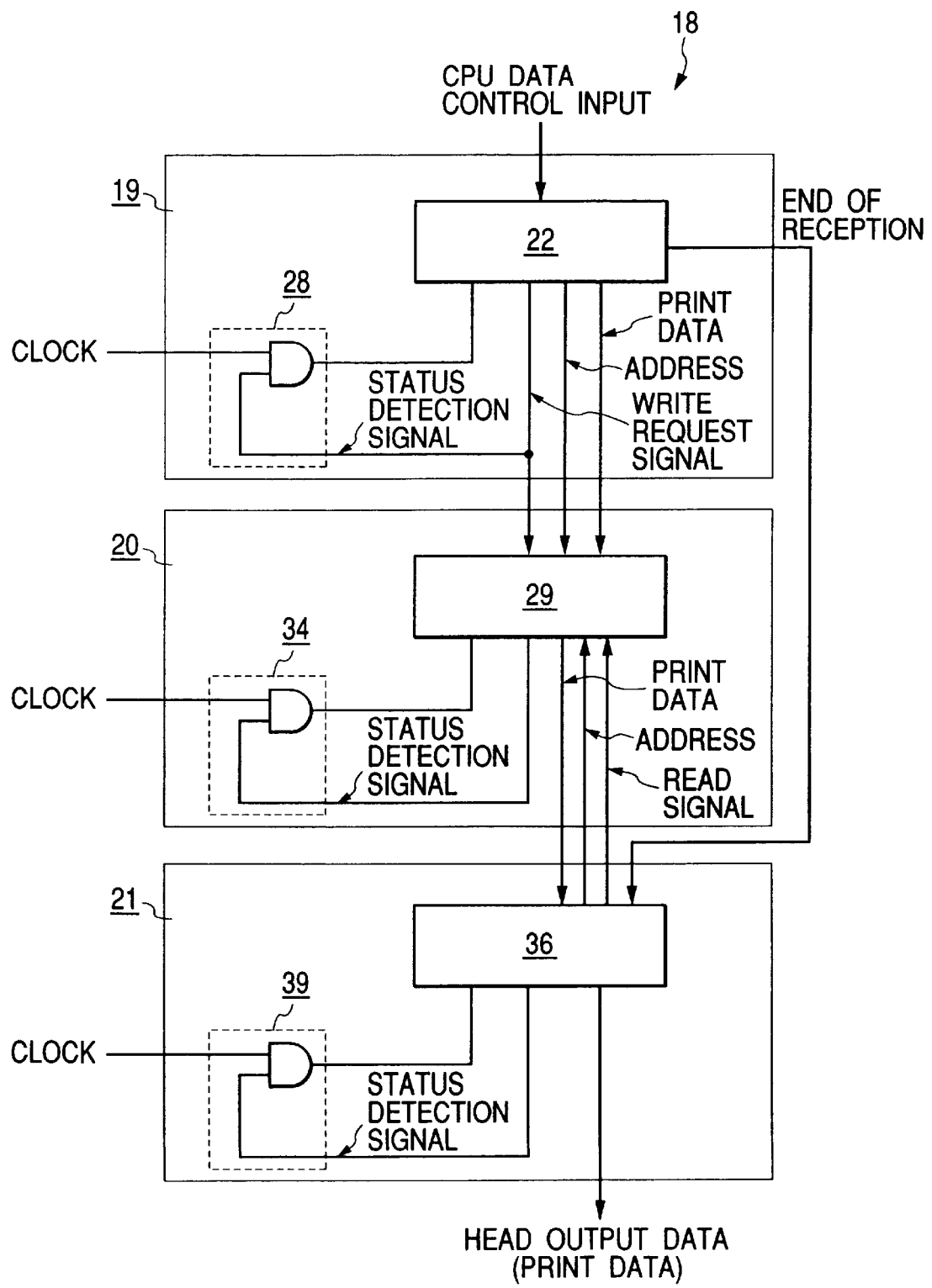
FIG. 3 is an explanatory diagram showing a second embodiment of a control circuit of the invention.

As shown in FIG. 3, a control circuit 18 in the second embodiment has three functional blocks of a data input unit 19, a data storing unit 20 and a heat output unit 21 on the semiconductor substrate 2 (not shown). The functional blocks 19, 20 and 21 are connected to each other. Some of them have different control timings.

Figure 4:
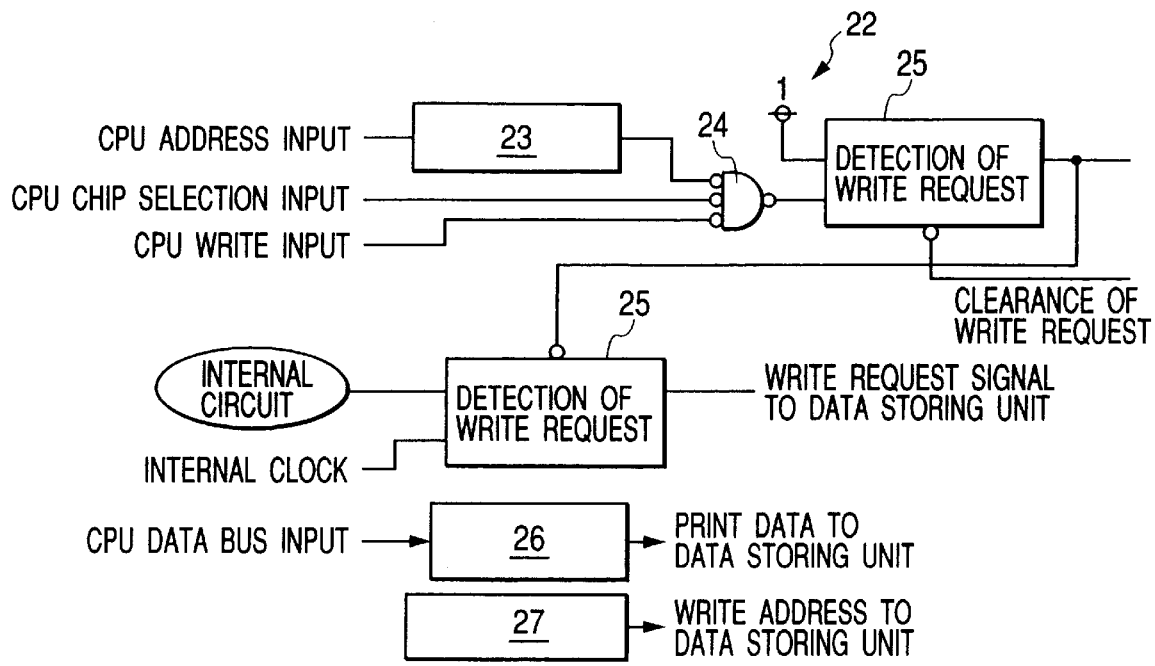
FIG. 4 is an explanatory diagram showing a data input unit as one of functional blocks in the second embodiment of the control circuit according to the invention.

The data input unit 19 has an operating unit 22 for receiving print data from a CPU, outputting a write request signal and print data to the data storing unit 20, notifying the head output unit 21 of the end of reception of the print data, outputting a status detection signal, and the like. As shown in FIG. 4, the operating unit 22 comprises an address decoder 23, an AND gate 24, a flip flop 25, a data latch circuit 26, and a data address generating circuit 27. The data input unit 19 also has a clock control unit 28 for controlling the supply of the clock signal to the operating unit 22 on the basis of the status detection signal outputted from the operating unit 22.

Figure 5:
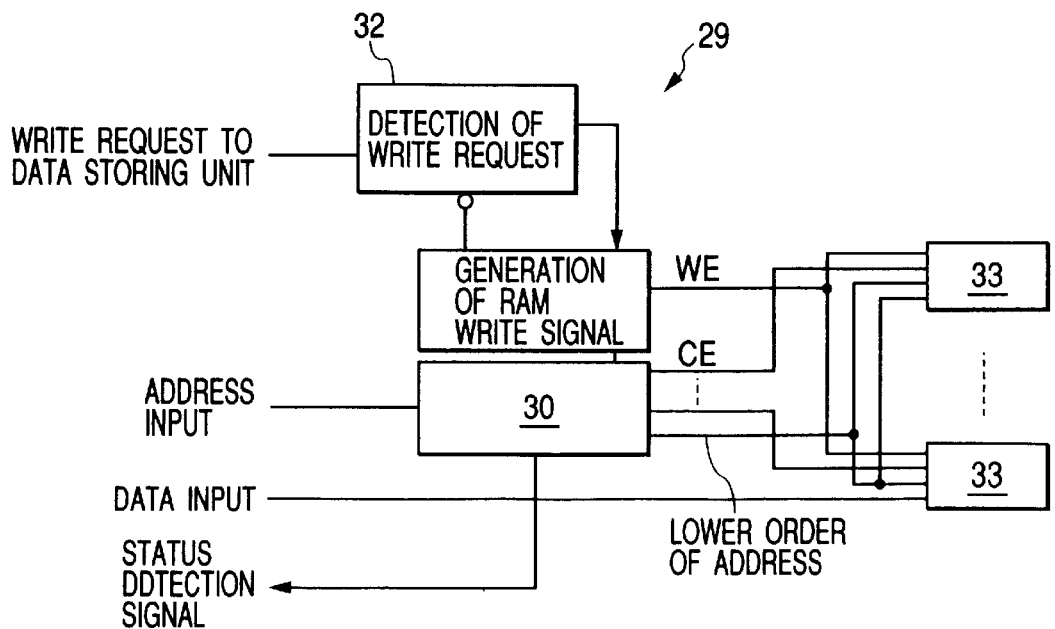
FIG. 5 is an explanatory diagram showing a data storing unit as one of the functional blocks in the second embodiment of the control circuit according to the invention.

The data storing unit 20 has an operating unit 29 for storing print data in response to the write request from the data input unit 19, transmitting the print data to the head output unit 21, outputting the status detection signal, and the like. The operating unit 29 comprises, as shown in FIG. 5, an address decoder 30, a flip flop 32, and an RAM unit 33. The data storing unit 20 also has a clock control unit 34 for controlling the supply of the clock signal to the operating unit 29 on the basis of the status detection signal outputted from the operating unit 29.

Figure 6:
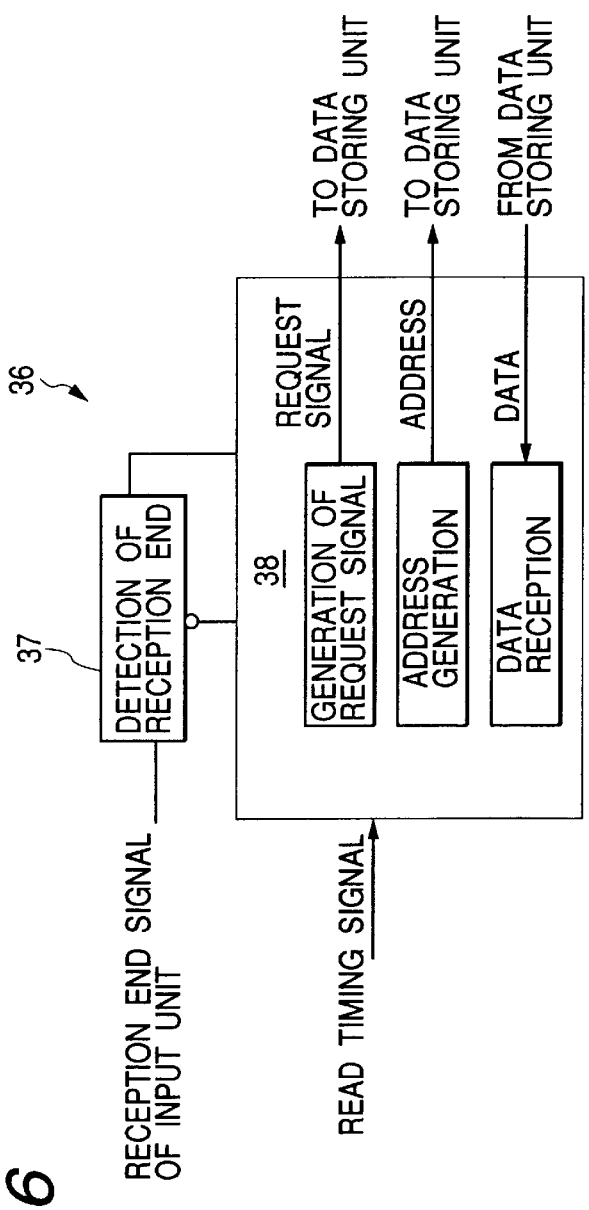
FIG. 6 is an explanatory diagram showing a head output unit as one of the functional blocks in the second embodiment of the control circuit according to the invention.

The head output unit 21 has an operating unit 36 for reading the print data stored in the data storing unit 20, outputting the read print data to a thermal head, outputting the status detection signal, and the like. As shown in FIG. 6, the operating unit 36 comprises a flip flop 37, a data storage/reading control circuit 38, and the like. The head output unit 21 also has a clock control unit 39 for controlling the supply of the clock signal to the operating unit 36 on the basis of the status detection signal outputted from the operating unit 36.

The action of the control circuit in the second embodiment will now be described.

First, as shown in FIGS. 3 and 4, an input signal which demands the operative status is supplied from the CPU (not shown) to the data input unit 19. At this time, the print data used for printing is supplied to the data input unit 19 via the data bus.

The data input unit 19 detects a write request to a data address in the data input unit 19 and enters the operative status. At this time, a write request signal as an input signal requesting the operative status is outputted to the data storing unit 20. The write request signal is outputted as a status detection signal of "1" indicative of the operative status to the clock control unit 28 in the data input unit 19.

Figure 7:
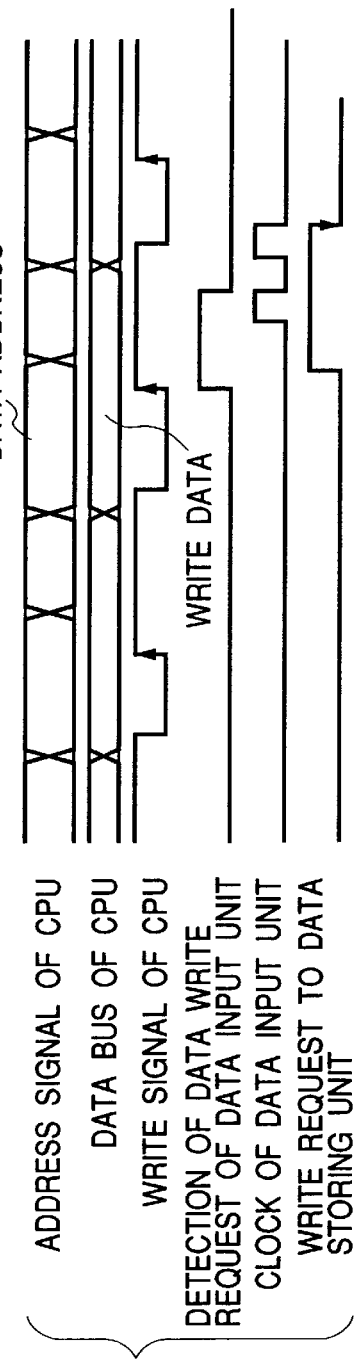
FIG. 7 is a time chart showing signals inputted/outputted to/from the data input unit as a functional block in the second embodiment of the control circuit according to the invention.

When the status detection signal of "1" indicative of the operative status is received, as shown in FIG. 7, the clock control unit 28 supplies the clock signal to the operating unit 22. In association with it, the data latch circuit 26 latches the print data from the CPU and the data address generating circuit 27 generates an address to which data is to be stored in the data storing unit 20.

The operating unit 22 outputs the address and the print data to the data storing unit 20. After that, the operating unit 22 enters the inoperative status and sets "0" in the write request signal to the data storing unit 20. When "0" is set in the write request signal to the data storing unit 20, the status detection signal becomes "0" indicative of the inoperative status. The clock control unit 28 accordingly stops the supply of the clock signal. In the state where the supply of the clock signal is stopped, the address and print data to the data storing unit 20 is held. Even when the data input unit 19 and the data storing unit 20 are not in the operative status simultaneously, the print data can be therefore supplied to the data storing unit 20.

When the reception of the print data of a predetermined amount from the CPU is finished, the data input unit 19 notifies the head output unit 21 of the end of the reception.

Figure 8:
FIG. 8 is a time chart showing signals inputted/outputted to/from the data storing unit as a functional block in the second embodiment of the control circuit according to the invention.

As shown in FIG. 5, the data storing unit 20 detects a predetermined change in the write request signal of the input data unit 19 and enters the operative status. At this time, as shown in FIG. 8, the status detection signal of "1" indicative of the operative status is supplied to the clock control unit 34. In association with it, the clock control unit 34 supplies the clocksignal to the operating unit 29. The data storing unit 20 stores the print data received from the data input unit 19 to an arbitrary address (in the RAM unit 33) instructed by the data input unit 19.

When the print data is stored in the predetermined address, the status detection signal becomes "0" indicative of the inoperative status. The clockcontrol unit 34 accordingly stops the supply of the clock signal.

Figure 9:
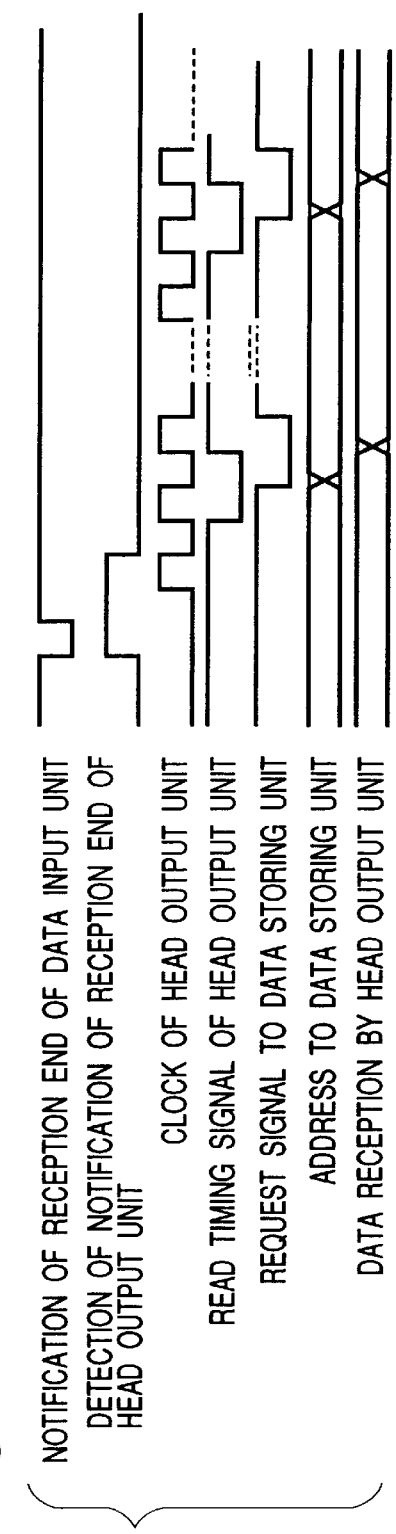
FIG. 9 is a time chart showing signals inputted/outputted to/from the head output unit as a functional block in the second embodiment of the control circuit according to the invention.

The head output unit 21 detects a predetermined change in the reception end signal as an input signal which requests the operative status and enters the operative status. At this time, the status detection signal becomes "1" indicative of the operative status and the clock control unit 39 accordingly supplies a clock signal to the operating unit 36 as shown in FIG. 9.

The head output unit 21 in the operative status outputs a data request signal as an input signal which requests the operative status of the data storing unit 20 and the address to the data storing unit 20 at a predetermined read timing. The data request signal is repeatedly outputted until the head output unit 21 reads a predetermined amount of the print data from the data storing unit 20.

Figure 10:
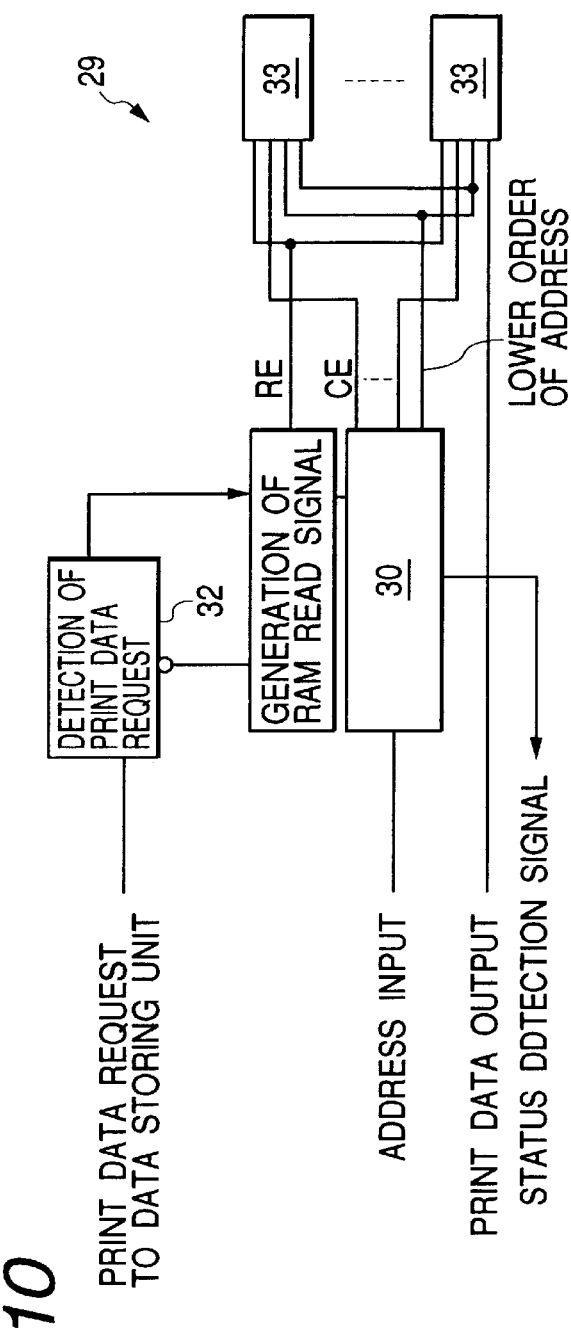
FIG. 10 is an explanatory diagram showing the data storing unit at the time of reading print data in the second embodiment of the control circuit according to the invention.

As shown in FIG. 10, the data storing unit 20 detects a predetermined change in the data request signal of the data storing unit 21 and enters the operative status.

Figure 11:
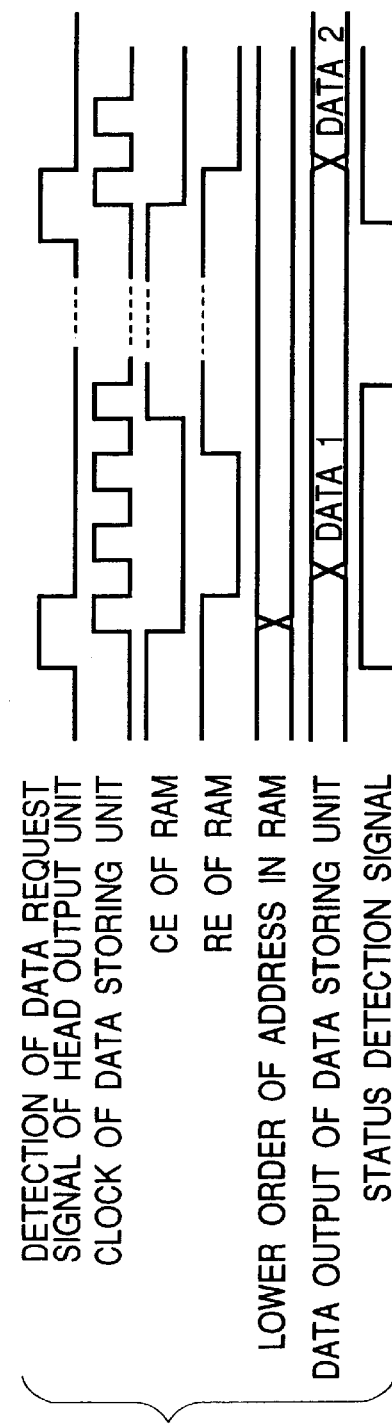
FIG. 11 is a time chart showing signals inputted/outputted to/from the data storing unit at the time of reading data in the second embodiment of the control circuit according to the invention.

Upon entering the operative status, as shown in FIG. 11, the data storing unit 20 outputs the status detection signal of "1" indicative of the operative status to the clock control unit 34 in the data storing unit 20. The clock control unit 34 in the data storing unit 20 outputs the clock signal to the operating unit 29. The data storing unit 20 outputs desired print data to the head output unit 21 under the control of the clock signal.

Figure 12:
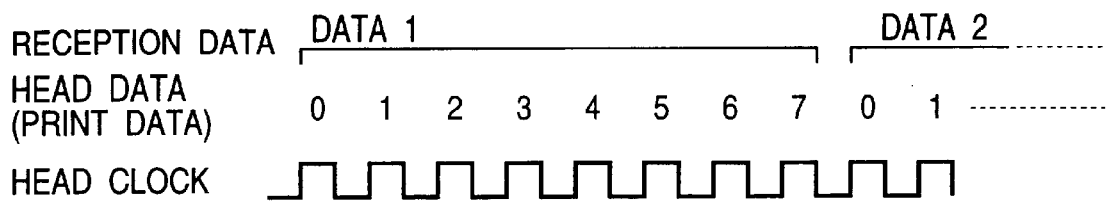
FIG. 12 is a time chart showing a printing status of the head output unit synchronized with a clock signal in the second embodiment of the control circuit according to the invention.

The head output unit 21 receives the desired print data outputted from the predetermined address in the data storing unit 20 and outputs the print data to the thermal head. The print data is outputted to the thermal head at pulse timings of the clock signal as shown in FIG. 12.

The head output unit 21 executes a process so as to achieve a desired print result on the basis of the predetermined print data. When the printing is finished, the status detection signal becomes "0" and the clock control unit 39 stops the supply of the clock signal.

When next print data is supplied from the CPU, the above operations are repeated According According to the second embodiment, therefore, even when the functional block (data input unit 19) which becomes operative at earlier timing and the functional block (data storing unit 20) which becomes operative at later timing are not simultaneously operative, the output signal (print data) of the functional block which becomes operative at earlier timing can be supplied to the functional block which becomes operative at later timing. Consequently, power consumed by the clock signal for the simultaneous operation of the two functional blocks can be reduced. Since the output signal can be supplied to the functional block which becomes operative at later timing after the operation of the functional block which becomes operative at earlier timing is stopped, the output signal which has been outputted earlier does not fluctuate due to a new input signal supplied to the functional block which becomes operative at earlier timing. Therefore, the designing of the circuit is simplified.

A third embodiment of the control circuit according to the invention will now be described.

Figure 13:
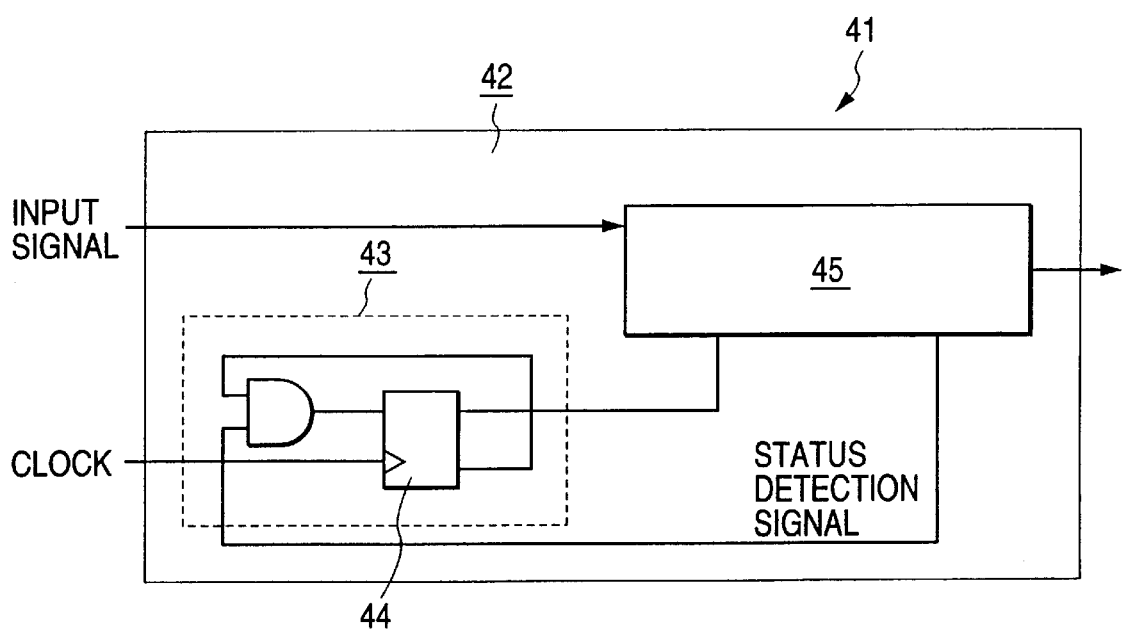
FIG. 13 is an explanatory diagram s showing a third embodiment of the control circuit according to the invention.

A control circuit 41 in the third embodiment has the same fundamental components as those in the first embodiment and has a functional block 42 on the semiconductor substrate 2. In the third embodiment, however, as shown in FIG. 13, a clock control unit 43 has a frequency dividing circuit 44.

The frequency dividing circuit 44 controls the cycle of the clock signal supplied from the outside to n times (n is a natural number of 2 or larger) from the viewpoint of preventing occurrence of a hazard in waveform of a clock signal supplied to an operating unit 45 and a fluctuation in the pulse width due to a delay in time between the supply of an input signal to the functional block 42 and the setting of the operative status based on the input signal.

Specifically, since there is slight delay time between the instant when the input signal is supplied to the functional block 42 and the instant when the functional block enters the operative status, a phase deviation occurs between a clock signal supplied from the outside (hereinbelow, called an external clock signal) and the status detection signal. When the cycle of a clock signal supplied to the operating unit 45 (hereinbelow, called an internal clock signal) is short, as shown by the conventional art in FIG. 14, a case where the waveform of the first pulse of the internal clock does not coincide with the other waveforms tends to occur. The deviation of the waveform of the internal clock often causes an erroneous operation of the functional block 42.

Figure 14:
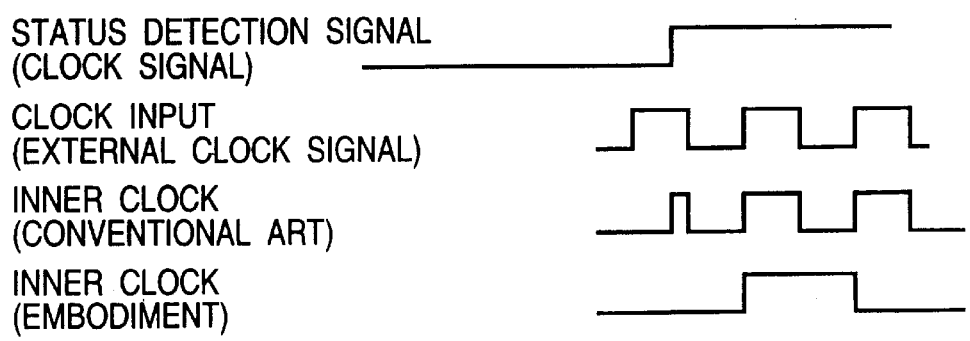
FIG. 14 is an explanatory diagram showing a control status of a clock signal by a frequency dividing circuit in the third embodiment of the control circuit according to the invention.

In the embodiment shown by the internal clock at the bottom of FIG. 14, therefore, the cycle of the internal clock is controlled by the frequency dividing circuit 44 ton times (twice in FIG. 14) as long as that of the external clock, thereby suppressing the occurrence of a deviation in the waveform.

The action of the control circuit in the third embodiment will now be described.

First, an input signal is supplied from an external CPU (not shown) to the functional block 42. The operating unit 45 in the functional block 42 receives the input signal and enters the operative status. At this time, the operating unit 45 outputs a status detection signal of "1" indicative of the operative status to the clock control unit 43.

The clock control unit 43 receives the status detection signal of "1" and supplies the internal clock signal to the operating unit 45. Since the cycle of the internal clock signal is controlled to n times as long as that of the external clock signal by the frequency dividing circuit 44, the probability of occurrence of a hazard in the waveform of the internal clock signal and a fluctuation in the pulse width is reduced.

When the internal clock signal is received, the operating unit 45 processes the input signal under the control of the internal clock signal and outputs the result of the process as an output signal to the outside of the functional block 42.

Upon outputting of the output signal, the operating unit 45 enters the inoperative status. At this time, the operating unit 45 outputs a status detection signal of "0" instructing the inoperative status to the clock control unit 43.

Upon receipt of the status detection signal instructing the inoperative status, the clock control unit 43 stops the supply of the internal clock to the operating unit 45.

According to the third embodiment, therefore, the cycle as of the internal clock can be controlled to n times as long as that of the external clock signal by the frequency dividing circuit 44, the occurrence of a hazard in the waveform of the internal clock and a fluctuation in the pulse width can be suppressed.

An erroneous operation of the control circuit 41 can be consequently suppressed and the control circuit 41 can properly exhibit its function.

A control circuit for control the recording of the printer in the second embodiment may be constructed by a plurality of the functional blocks 42 in the control circuit 41 in the third embodiment.

A fourth embodiment of the control circuit according to the invention will be described.

Figure 15:
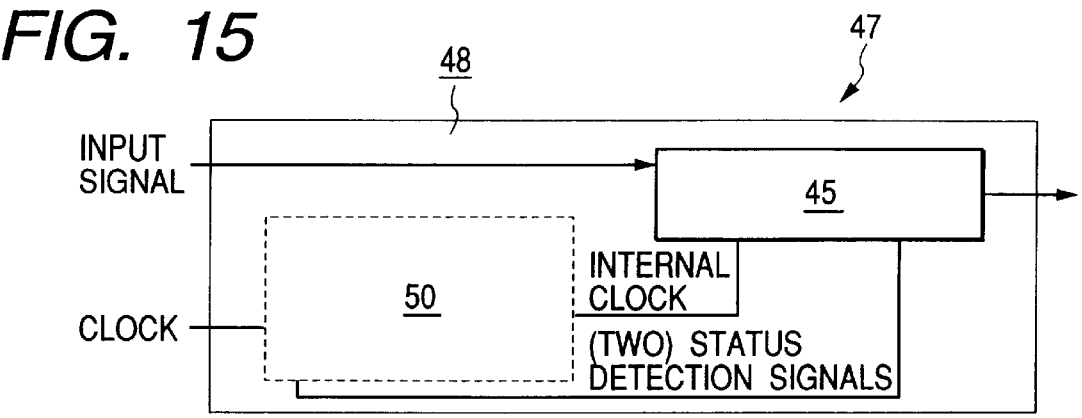
FIG. 15 is an explanatory diagram showing a fourth embodiment of a control circuit according to the invention.
Figure 16:
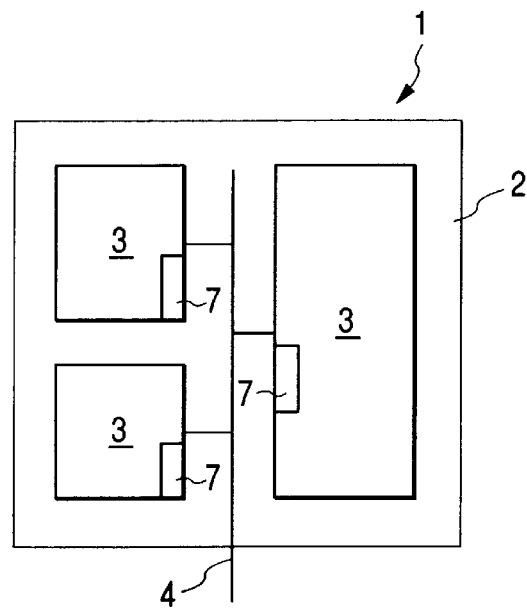
FIG. 16 is an explanatory diagram showing a conventional control circuit.
Figure 17:
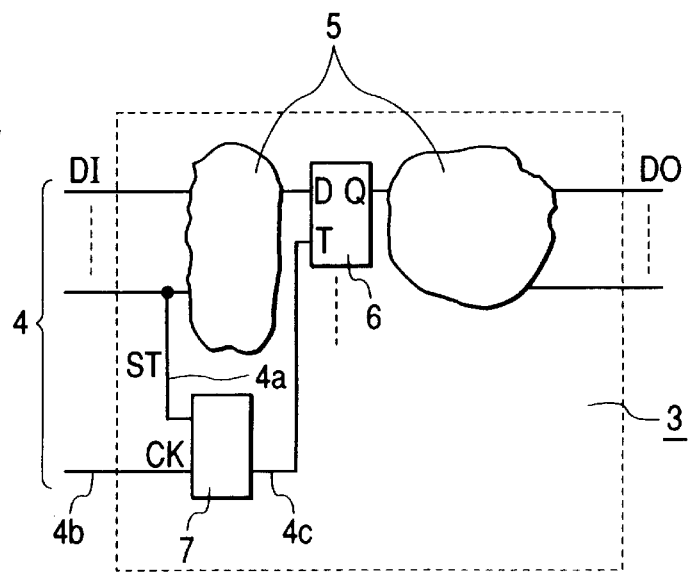
FIG. 17 is an explanatory diagram of a functional block in the conventional control circuit.

As shown in FIG. 15, a control circuit 47 in the fourth embodiment has an operating unit 45 in a functional block 48. The operating unit 45 performs a predetermined operation on the basis of an input signal under the control of a clock signal.

The operating unit 48 in the fourth embodiment has a plurality of operative statuses and performs operations (output of the output signal and the like) which are different according to the operative statuses.

The functional block 48 has a clock control unit 50 for controlling the supply of the internal clock signal to the operating unit 45 on the basis of the status detection signal.

In each of the operative statuses, the clock control unit 50 outputs an internal clock signal of a cycle which varies according to the operative status detection signal from the viewpoint of preventing the occurrence of a hazard in the waveform and a fluctuation in the pulse width of the internal clock signal supplied to the operating unit 49.

The action of the control circuit 47 in the fourth embodiment will now be described.

First, an input signal for requesting the operative status is supplied from a CPU (not shown) to the functional block 48. Upon receipt of the input signal, the operating unit 9 enters the operative status. In accordance with the input signal, the predetermined operating status varies. In the embodiment, it is assumed that the operating unit 45 has the first to third operating statuses.

When the operating unit 45 is set in the first operating status, the operating unit 45 outputs a status detection signal of "0" indicative of the first operative status to the clock control unit 50. When the operating unit 45 is set in the second operating status, the operating unit 45 outputs a status detection signal of "10" indicative of the second operative status to the clock control unit 50. Further, when the operating unit 45 is set in a third operative status, the operating unit outputs a status detection signal of "11" indicative of the third operative status to the clock control unit 50.

When the status detection signal of "01" indicative of the first operative status is received from the operating unit 45, the clock control unit 50 outputs an internal clock signal having a cycle twice as long as that of the external clock signal to the operating unit 45. When the status detection signal of "10" indicative of the second operative status is received from the operating unit 45, the clock control unit 50 outputs an internal clock signal having a cycle four times as long as that of the external clock signal to the operating unit 45 Further, when the status detection signal of "11" indicative of the third operative status is received from the operating unit 45, the clock control unit 50 outputs an internal clock signal having a cycle eight times as long as that of the external clock signal to the operating unit 45.

The operating unit 45 processes the input signal under the control of the internal clock signal of each cycle and outputs the result of the process as an output signal to the outside of the functional block 48.

Upon outputting of the output signal, the operating unit 45 enters the inoperative status. At this time, the operating unit 45 outputs the status detection signal of "00" indicative of the inoperative status to the clock control unit 50.

Upon receipt of the status detection signal of "00" indicative of the inoperative status, the clock control unit 50 stops the supply of the internal clock signal to the operating unit 45.

According to the fourth embodiment, therefore, also in the functional block 48 having the plurality of operating statuses, the delay between the external clock signal supplied from the outside to the clock control unit 50 and the internal clock signal supplied from the clock control unit 50 to the functional block 48 can be compensated. The functional block 48 can be therefore prevented from an erroneous operation caused by the occurrence of a hazard in the waveform of the clock signal and a fluctuation in the pulse width.

A control circuit for controlling the recording of the printer in the second embodiment can be also formed by using a plurality of functional blocks 48 of the fourth embodiment.

The invention is not limited to the foregoing embodiments but can be variously modified as necessary.

According to the control circuit of the invention, since it is unnecessary to provide a particular control means for controlling the supply of the clock signal on the outside of the functional block, power consumption of the clock signal can be suppressed with a simple configuration and the control circuit can be miniaturized.

According to another control circuit of the invention, in addition to the above effect, the maximum power consumption of the clock signal by the simultaneous operation of the functional blocks can be reduced.

According to further another control circuit of the invention, occurrence of a hazard in the waveform of the clock signal and a fluctuation in the pulse width can be suppressed with a simple configuration. Thus, in addition to the above effects, an erroneous operation of the functional block can be easily suppressed.

According to further another control circuit of the invention, further, in the case where the functional block has the plurality of operative statuses, an erroneous operation of the functional block can be easily suppressed.

What is claimed is:

1. A control circuit comprising:
    a functional block, which is provided on a semiconductor substrate, having an operating unit that performs a predetermined operation in response to an input signal requesting an operative status and that stops the predetermined operation in response to an input signal requesting an inoperative status, the operating unit being under the control of a clock signal; and
    a clock control unit, which is provided in the functional block, to control the supply of the clock signal to the operating unit,
    wherein the operating unit supplies a status detection signal indicative of the operative status or the inoperative status to the clock control unit,
    when the status detection signal indicates the operative status, the clock control unit supplies the clock signal to operate the operating unit, and when the status detection signal indicates the inoperative status, the clock control unit stops the supply of the lock signal to stop the operating unit.

2. A control circuit comprising:
    a plurality of functional blocks that are connected to each other, wherein some of the plurality of functional blocks have different operation timings, at least one functional block which operates first is set to be in the inoperative status when an output signal is outputted to at least one functional block which operates later, and a status detection signal Indicative of the inoperative status of the at least one functional block which operates first is outputted to a clock control unit of the functional block which operates first,
    each functional block provided on a semiconductor substrate and having an operating unit that performs a predetermined operation in response to an input signal requesting an operative status and that stops the predetermined operation in response to an Input signal requesting an inoperative status, the operating unit being under the control of a clock signal and a clock control unit provided in the functional block to control the supply of the clock signal to the operating unit,
    wherein the operating unit supplies a status detection signal indicative of the operative status or the inoperative status to the clock control unit,
    when the status detection signal indicates the operative status, the clock control unit supplies the clock signal to operate the operating unit, and when the status detection signal indicates the inoperative status, the clock control unit stops the supply of the clock signal to stop the operating unit.

3. The control circuit according to claim 1, wherein the clock control unit further comprises a frequency dividing circuit.

4. The control circuit according to claim 3, wherein the operating unit has a plurality of operative statuses, and the clock control unit supplies the clock signal of a dividing ratio which varies according to a selected operative status of the plurality of operation statuses of the operating unit.

5. The control circuit according to claim 1, wherein the clock signal is supplied directly from the clock control unit to the operating unit.

6. The control circuit according to claim 1, wherein the status detection signal is supplied directly from the operating unit to the clock control unit.

7. The control circuit according to claim 1, wherein the clock control unit comprises logic that performs a logical and function between the status detection signal and the clock signal.

8. The control circuit according to claim 1, wherein the operating unit supplies the status detection signal indicative of the inoperative status to the clock control unit when a result of processing of the input signal is supplied as an output signal from the function block.

9. A control circuit comprising a plurality of functional blocks, each function block being supplied with a clock signal and including:

an operating unit to receive an input signal that requests one of an operative status and an inoperative status and to perform a predetermined operation when the operative status is requested by the input signal; and a clock control unit to control the supply of the clock signal to the operating unit, wherein the operating unit supplies a status detection signal indicative of the operative status to the clock control unit when the input signal indicates a request for operation and supplies a status detection signal indicative of the inoperative status to the clock control unit when the input signal Indicates a request for termination of operation, and supplies the status detection signal indicative of the inoperative status to the clock control unit when a result of processing of the input signal is supplied as an output signal from the function block, and the clock control unit supplies the clock signal to the operating unit when the status detection signal indicates the operative status and stops supply of the clock signal the operating unit when the status detection signal indicates the inoperative status.

10. The control circuit according to claim 9, wherein each clock control unit further comprises a frequency dividing circuit.

11. The control circuit according to claim 10, wherein each operating unit has a plurality of operative statuses, and the clock control unit of one of the operating units supplies a clock signal of a dividing ratio which varies according to a selected operative status of the plurality of operation statuses of the one of the operating units.

12. The control circuit according to claim 9, wherein the clock signal from each clock control unit is supplied directly to the corresponding operating unit.

13. The control circuit according to claim 9, wherein the status detection signal from each operating unit is supplied directly to the corresponding clock control unit.

14. The control circuit according to claim 9, wherein each clock control unit comprises logic that performs a logical and function between the clock signal and the status detection signal from the corresponding operating unit.

\* \* \* \* \*

UNITED STATES PATENT AND TRADEMARK OFFICE
CERTIFICATE OF CORRECTION

PATENT NO. : 6,342,795 B1
DATED : January 29, 2002
INVENTOR(S) : Yoshikatsu Ohta It is certified that error appears in the above-identified patent and that said Letters Patent is hereby corrected as shown below:

<u>Column 10,</u>
Line 19, delete "lock" and substiute -- clock -- in its place.
Line 28, delete "Indicative" and substitute -- indicative -- in its place
Line 36, delete "Input" and substitute -- input -- in its place.

Signed and Sealed this

Twentieth Day of August, 2002

Attest:

JAMES E. ROGAN
Attesting Officer
Director of the United States Patent and Trademark Office